United States Patent [19]
Villax

[11] 3,927,094
[45] Dec. 16, 1975

[54] ALKALI METAL POLYMETAPHOSPHATE COMPLEXES OF DOXYCYCLINE AND PREPARATION THEREOF

[76] Inventor: Ivan Villax, Travessa do Ferreiro, 3, Lisbon 3, Portugal

[22] Filed: July 3, 1973

[21] Appl. No.: 376,149

Related U.S. Application Data

[63] Continuation-in-part of Ser. No. 353,528, April 23, 1973, abandoned, which is a continuation-in-part of Ser. No. 194,049, Oct. 29, 1971, abandoned.

[30] Foreign Application Priority Data

Oct. 30, 1970 Portugal .................................. 54708

[52] U.S. Cl. ........................... 260/559 AT; 424/227
[51] Int. Cl.² ........................................ C07C 103/19
[58] Field of Search ............................... 260/559 AT

[56] References Cited
UNITED STATES PATENTS

| | | | |
|---|---|---|---|
| 2,791,609 | 5/1957 | Kaplan | 260/559 AT |
| 2,795,528 | 6/1957 | Buckwalter et al. | 260/559 AT |
| 3,053,892 | 9/1962 | Sieger et al. | 260/559 AT |
| 3,239,499 | 3/1966 | Rennhard et al. | 260/559 AT |

*Primary Examiner*—Richard J. Gallagher
*Assistant Examiner*—Ann Marie T. Tighe
*Attorney, Agent, or Firm*—Ostrolenk, Faber, Gerb & Soffen

[57] ABSTRACT

Alkali metal polymetaphosphate complexes of α-6-deoxy-5-hydroxytetracycline are superior to prior art tetra-cyclines and complexes thereof.

16 Claims, No Drawings

ALKALI METAL POLYMETAPHOSPHATE COMPLEXES OF DOXYCYCLINE AND PREPARATION THEREOF

This is a continuation-in-part of application Ser. No. 353,528 filed Apr. 23, 1973, now abandoned, which is a continuation-in-part of application Ser. No. 194,049 filed Oct. 29, 1971, now abandoned.

The present invention is concerned with the perparation of alkali-metal polymetaphosphate complexes of α-6-deoxy-5-hydroxytetracycline and, more particularly, is concerned with the polymetaphosphate mono- and disodium and potassium complexes of α-6-deoxy-5-hydroxytetracycline having high solubility in water. The α-6-deoxy-5-hydroxytetracycline, also called doxycycline, is a large spectrum antibiotic exerting a prolonged action even when administered orally and is today one of the best antibiotics of the tetracycline group.

The metallo-metaphosphate complexes of tetracycline obtained in an aqueous medium, are described in U.S. Pat. No. 2,791,609 and the metaphosphoric acid complexes of the various tetracyclines in U.S. Pat. No. 3,053,892. U.S. Pat. No. 3,200,149 teaches, among others, α-6-deoxy-5-oxytetracycline, the acid addition salts and the pharmaceutically acceptable metal salts thereof.

The hexametaphosphate sodium complex of tetracycline, described in U.S. Pat. No. 2,791,609, has a reduced solubility in water (3.2 mg/ml) and is characterized by being absorbed more efficiently in the organism than tetracycline itself, thus provoking higher blood levels. It was observed that when reacting hexametaphosphate sodium with doxycycline in an aqueous medium, according to the process described in U.S. Pat. No. 2,791,609, the hexametaphosphate sodium complex of doxycycline precipitated, and the complex, thus obtained, is characterized by a high insolubility in water, its solubility being from 0.6 to 0.8 mg/ml. However, the pharmacological behavior of this complex is entirely different from that of the tetracycline complex. Instead of increased blood levels, considerably lower ones were found, and in certain patients no detectable concentration could be obtained, although its antibiotic activity "in vitro" was equivalent to its doxycycline content, thus confirming that no obvious analogy exists between α-6-deoxy-5-hydroxytetracycline and the "natural" tetracyclines.

Reaction of free hexametaphosphoric acid with α-6-deoxy-5-hydroxytetracycline in an inert organic medium, prepared in accordance with the process described in U.S. Pat. No. 3,053,892, yields the corresponding acid complex, having a higher solubility in water.

The present invention covers the new group, not disclosed hitherto, of doxycycline alkali-metal polymetaphosphate complexes; more particularly, it relates to doxycycline polymetaphosphate sodium complexes. This new group of complexes is obtained by reacting, under anhydrous conditions, doxycycline with an alkali-metal salt of metaphosphoric acid, having at least one free acid function, while the known tetracycline hexametaphosphate sodium complexes are prepared, according to U.S. Pat. No. 2,791,609, by reacting tetracycline with sodium hexametaphosphate in presence of water. The doxycycline polymetaphosphate sodium complexes, obtained according to the present invention, are characterized by a solubility in water of 4.5 to about 300 mg/ml and by provoking much higher and more lasting blood levels, while the doxycycline hexametaphosphate sodium complex has a solubility in water around 0.8 mg/ml and provokes lower blood levels than does doxycycline hyclate or base.

With a view to facilitating the distinction between this new group of complexes and those already known, the complexes described in the present invention will be hereinafter designated as alkali-metal polyphosphate complexes. This expression is entirely justified if we should consider the polymeric nature of metaphosphoric acid $(HPO_3)_n$, the degree of polymerization of the metaphosphoric acid being variable.

For preparing the new alkali-metal polyphosphate complexes of doxycycline, each mole of metaphosphoric acid — preferably prepared recently — is first reacted with 1, 2, 3, 4 or 5 moles of sodium or potassium hydroxide, and then with 1 to 5 moles of doxycycline. Alternatively, the doxycycline can be reacted with the metaphosphoric acid and then reacted with the alkali-metal hydroxide. For preparing the new polyphosphate complexes of doxycycline, one may use doxycycline base, hydrochloride, hyclate or other suitable acid addition salts, or a molecular complex with an ammonium quaternary compound, or the amine or imine complexes, such as the N,N'-dibenzylethylenediamine and N,N'-dibenzylethylenediimine complexes. One can use as inert medium dimethylformamide, ethylacetate, methanol, ethanol, dichloromethane, chloroform and mixtures thereof. Once formation of the complex has been completed, the polyphosphate complex is precipitated with a non-solvent, such as, for instance, isopropyl alcohol, ethyl-ether, isopropylether, hexane or a mixture thereof, and filtered. Naturally, isolation may be carried out by other processes, such as, for instance, by evaporation of the solvent in vacuum, eventually followed by treatment of the residue with a non-solvent in order to provoke crystallization. One can also stir the residue in water in order to obtain a solution/suspension, which is then lyophilized.

The sodium and potassium salts of metaphosphoric acid are prepared preferably immediately prior to their use. These can be advantageously prepared by dehydration of orthophosphoric acid, or by reacting phosphorous pentoxide with a strictly equimolecular amount of water in an inert organic solvent, such as those above enumerated, and subsequently adding the stoichiometrical amount of sodium or potassium hydroxide necesary to prepare mono-, di-, tri-, tetra- and penta-metal salts of metaphosphoric acid.

The analysis of the alkali-metal polyphosphate complexes, thus obtained, indicates that the empirical formula of the anhydrous product is:

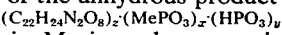

$(C_{22}H_{24}N_2O_8)_z \cdot (MePO_3)_x \cdot (HPO_3)_y$ wherein Me is a pharmaceutically acceptable alkali-metal, $z = 1$ to $5$, $x = 1$ to $5$, $y = 1$ to $5$, $x + y$ being $\leq 6$ and $z \leq y$.

One has always to take in consideration the fact that the degree of polymerization of metaphosphoric acid can vary in practice, and consequently a preparation of the alkali-metal polyphosphate complex of doxycycline can always contain simultaneously products of various degrees of polymerization.

It is to note that his empirical formula, when Me is Na, $y$ and $z = 5$ and $x = 1$, is identical to that of the hexametaphosphate sodium complex of doxycycline described in U.S. Pat. No. 2,791,609. However, these two complexes are distinct compounds in view of the fact that the equivalent polyphosphate complex is many times more soluble than the hexametaphosphate sodium complex. Moreover, the infrared absorption curves of the two complex groups reveal differences in the region of 7.9–8.1$\mu$ and 9.2–9.6$\mu$, thus proving that the complexation takes place through different pathways.

The differences between the two groups of complexes as far as solubility and infrared curves are concerned are warrant of the fact that the intramolecular structure is essentially different, and it can be concluded that the mechanism of complexation as well as the functional groups of doxycycline involved in this complexation are not identical in the two groups of complexes.

For the purpose of comparison and differentiation, the metaphosphoric acid complexes as well as the acid addition salts of doxycycline were prepared in various molar proportions in accordance with U.S. Pat. Nos. 3,053,892 and 3,200,149. All these acid complexes and acid addition salts were of considerable lower solubility in water than the alkali-metal polyphosphate complexes and the blood levels obtained after administration were quantitatively and in duration inferior to those obtained by the alkali-metal polyphosphate complexes. All the attempts made with a view to transforming the metaphosphoric acid addition salts of doxycycline into the alkali-metal polyphosphate complexes by treatment with aqueous sodium or potassium hydroxide were unsuccessful.

The blood levels obtained after oral administration of simple mixtures of doxycycline hyclate and sodium hexametaphosphate as well as of doxycycline base monohydrate and sodium hexametaphosphate were significantly lower than those obtained after administration of doxycycline hyclate. Thus, the hexametaphosphate sodium salt does not improve the absorption of doxycycline when administered simultaneously.

The new polyphosphate sodium or potassium complexes of doxycycline described in the present invention are favorably comparable to the acute and chronic toxicity of doxycycline and are pharmaceutically acceptable. The present invention represents a considerable step in improving the activity and clinical usefulness of doxycycline by increasing the blood levels when it is administered in the form of alkali-metal polyphosphate complexes. Other advantages of the new complexes are that they are more palatable than doxycycline hydrochloride or hyclate, and form stable or easily stabilized solutions and/or suspensions. Finally, the side effects caused by doxycycline are considerably reduced when administering these complexes, especially concerning gastric reactions. There is also a decrease in the incidence of photosensitivity, a side effect which occurs with a certain frequency in the administration of doxycycline, as hyclate or base.

The examples appearing hereafter illustrate the present invention, without however restricting its scope to their extent, and indicate the blood levels obtained after administration of the new aforesaid polyphosphate complexes. Naturally, these may be associated with any other therapeutic agent, with which there is no incompatibility or when such as association is justified from a clinical point of view.

EXAMPLES 1. 0.5 grs. of sodium hydroxide dissolved in 10 mls. of methanol was added to a solution containing 8 grs. of metaphosphoric acid, prepared immediately prior to carrying out the present reaction, in 200 mls. of a mixture of methanol and chloroform (1:1 part). Once the momentarily formed precipitate dissolved, 23.1 grs. of doxycycline base (assay 961 mcg/mg) in 100 mls. of ethanol was added. After stirring for 1 hour, 350 mls. of isopropyl alcohol was added, thus provoking crystallization of the new polyphosphate sodium complex of doxycycline, having the composition $(C_{22}H_{24}N_2O_8)_3 \cdot (HPO_3)_5 \cdot NaPO_3$. Melting point 185°–189° C. $[\alpha]_D - 85$ (c = 1 in methanol containing 1% concentrated hydrochloric acid). $E_{1cm}^{1\%}$ 299 at 268 m$\mu$ and 232 at 349 m$\mu$. pH of the 1% aqueous suspension 2.5. The infrared absorption curve of the suspension in mineral oil mull shows the following main peaks: 3 $\mu$, 6.0 $\mu$, 6.19 $\mu$, 6.31 $\mu$, 6.49 $\mu$, 8.07 $\mu$, 8.65 $\mu$, 8.82 $\mu$, 9.45 $\mu$, 9.6 $\mu$, 9.9 $\mu$, 10.63 $\mu$, 11.8 $\mu$, 12.4 $\mu$, 14 $\mu$. No maximum is present between 7.6 to 8 $\mu$. The excess of doxycycline and metaphosphoric acid stays in solution in form of metaphosphoric acid complex of doxycycline.

2. Example 1 was repeated, but adding 1 gr. of sodium hydroxide instead of 0.5 grs. to the solution of metaphosphoric acid. Melting point 187°–194° C. $\lambda$ max. 267, 349 m$\mu$, pH of the 1% aqueous solution/suspension 2.65.

3. Example 1 was repeated, but adding 1.5 grs. of sodium hydroxide instead of 0.5 grs. to the solution of metaphosphoric acid. The new complex thus obtained weighs 19.1 grs. Melting point 172°–182° C. $E_{1\,cm}^{1\%}$ 256 at 267/68 m$\mu$ and 200 at 348/50 m$\mu$. pH of the 1% aqueous suspension 2.9.

4. 250 mls. of methanol was added to 250 mls. of chloroform containing 20 grs. of metaphosphoric acid, under stirring at room temperature, followed by the addition of 92.67 grs. of anhydrous doxycycline base (assay 998.8 mcg/mg), 375 mls. of methanol, and 1.66 grs. of sodium hydroxide dissolved in 45 mls. of methanol. After agitation for 15 minutes, 1600 mls. of isopropyl alcohol was added to complete the precipitation. The precipitate was then filtered, washed with ispropyl alcohol and dried, yielding 86.8 grs. of the polyphosphate sodium complex of doxycycline of the formula $(C_{22}H_{24}N_2O_8)_5 \cdot NaPO_3 \cdot (HPO_3)_5$. Solubility in water at 20° C. 300 mg/ml. Melting point 184°–188° C. $E_{1cm}^{1\%}$ 327 at 268 m$\mu$ and 254 at 349 m$\mu$ (in methanol containing 1% concentrated hydrochloric acid). Optical rotation $[\alpha]_D - 100$ (c − 1 in methanol containing 1% concentrated hydrochloric acid). $[\alpha]_D - 55$ (c = 1 in water). Water content (by Karl-Fisher titration) 4.1. pH of the 1% aqueous solution 2.9.

5. 4.2 grs. of phosphorous pentoxide was covered with 100 mls. of chloroform and 0.54 ml. of water was added. After stirring for two and a half hours at 35° C, 100 mls. of methanol were added and stirring continued for an additional 15 minutes. Subsequently, 50 mls. of methanol was added, followed by the addition, portionwise, of 22.2 grs. of doxycycline base (992 mcg/mg). The clear solution was maintained at a temperature not exceeding 35°C. After stirring for 1 hour, 0.4 gr. of sodium hydroxide dissolved in 4.4 mls of methanol was added and then stirred for 15 minutes more. It was then crystallized by adding 400 mls. of isopropanol. After filtering and drying, it yielded 20 grs. of product identical to that obtained in Example 4.

6. 250 mls. of methanol was added to 250 mls. of chloroform containing 20 grs. of metaphosphoric acid, under stirring at room temperature, followed by the addition of 74.14 grs. of anhydrous doxycycline base (assay 998.8 mcg/mg), 375 mls. of methanol, and 3.32 grs. of sodium hydroxide dissolved in 45 mls. of methanol. After agitation for 15 minutes, 1600 mls. of isopropyl alcohol was added to complete the precipitation. The precipitate was then filtered, washed with isopropyl alcohol and dried, yielding 71.3 grs. of the polyphosphate disodium complex of doxycycline of the formula $(C_{22}H_{24}N_2O_8)_4 \cdot (NaPO_3)_2 \cdot (HPO_3)_4$. Solubility in water at 20° C. 292 mg/ml. Melting range 176°–183° C. $E_{1cm}^{1\%}$ 300 at 268 m $\mu$ and 235 at 351 m $\mu$ (in methanol containing 1% concentrated hydrochloric acid). Optical rotation $[\alpha]_D -95$ (c=1 in methanol containing 1% concentrated hydrochloric acid); $[\alpha]_D -90$ (c=1 in water). Water content (by Karl-Fisher titration) 3.5%. pH of the 1% aqueous solution 3.

Gelatine capsules, each containing 200 mgs. of the polyphosphate monosodium complex of doxycycline, as well as capsules containing 200 mgs. of the polyphosphate disodium complex of doxycycline, were prepared, and capsules containing 200 mgs. of doxycycline hyclate were also prepared as a control.

The average blood levels obtained in each group of 10 volunteers, after administration of 1 capsule per person before breakfast, are indicated hereunder.

| | Average Serum Concentration in mcg/ml expressed in 100% doxycycline | | | | | |
|---|---|---|---|---|---|---|
| After—hours | ½ | 1 | 2 | 6 | 12 | 24 |
| Polyphosphate monosodium complex of doxycycline | 1.3 | 2.4 | 3.1 | 2.9 | 2.0 | 1.1 |
| Polyphosphate disodium complex of doxycycline | 1.20 | 2.30 | 3.30 | 3.00 | 2.10 | 1.10 |
| Doxycycline hyclate | 0.8 | 1.5 | 2.3 | 2.4 | 1.6 | 0.7 |

7. For the purpose of comparison, the hexametaphosphate sodium complex of doxycycline was prepared in accordance with the process described in U.S. Pat. No. 2,791,609 of Kaplan et al as follows:

2.31 grs. of sodium hexametaphosphate was dissolved in 23.1 mls. of water, the pH was adjusted to 1.7 with concentrated hydrochloric acid, and this solution was then added dropwise, under stirring, at room temperature to a solution containing 5.25 grs. of doxycycline hyclate in 52 mls. of 1:1 water and ethanol. Once the addition was over, stirring continued for 1 additional hour. The precipitate thus formed was filtered, washed with water and then with ethanol 95%. When dried at 50°C., the hexametaphosphate sodium complex of α-6-deoxy-5-hydroxytetracycline decomposes at 210° C. with previous softening, carbonization being complete at 220° C. $E_{1cm}^{1\%}$ 296 at 268 m $\mu$ and 234 at 349 m $\mu$. Humidity content 7.6% by the Karl-Fisher method. $[\alpha]_D -85$ (c=1 in methanol containing 1% concentrated hydrochloric acid). Solubility in water at 20° C. 0.65 mg/ml — the complex is little soluble in methanol and soluble in dimethylformamide. pH of the 1% aqueous solution 3.6. The infrared absorption curve shows main peaks at 3.05 $\mu$, 6 $\mu$, 6.2 $\mu$, 6.32 $\mu$, 7.9 $\mu$, 8.06 $\mu$, 8.63 $\mu$, 9.3 $\mu$, 9.6 $\mu$, 9.9 $\mu$, 10.65 $\mu$, 11.35 $\mu$, 12.1 $\mu$. After filtration, additional amounts crystallize from the mother-liquors with satisfactory characteristics, thus raising the yield to 92.9%.

Gelatine capsules were prepared with the complex above obtained, each containing the amount equivalent to 200 mgs. of anhydrous doxycycline base, and control capsules of doxycycline hyclate, each containing the amount equivalent to 200 mgs. of anhydrous doxycycline base. After administration of one capsule per person before breakfast, the blood levels were determined.

The average values obtained in 10 volunteers are indicated hereunder:

| | Average Serum concentration in mcg/ml expressed in 100% doxycycline | | | |
|---|---|---|---|---|
| After—hours | 1 | 4 | 8 | 24 |
| Doxycycline hexametaphosphate sodium complex | 0.33 | 0.64 | 0.5 | 0.2 |
| Doxycycline hyclate | 1.10 | 2.2 | 1.6 | 0.6 | thus demonstrating that the complex is inferior to both the polyphosphate sodium complex of doxycycline and doxycycline hyclate.

8. For a further comparison, metaphosphoric acid complexes of doxycycline were prepared according to the process described in U.S. Pat. No. 3,053,892 of Sieger et al, as follows:

A. 23.1 grs. of doxycycline base in 65 mls. of methanol was added to a solution containing 4 grs. of metaphosphoric acid in 130 mls. of 1:1 chloroform and methanol. After stirring for 1 hour, it was precipitated by adding isopropyl alcohol, yielding 24.9 grs. of the metaphosphoric acid complex of doxycycline (1:1 mole). Melting point 191°–194° C. with subsequent decomposition at 202° C. $E_{1cm}^{1\%}$ 327 at 267 m$\mu$ and 251 at 349 m$\mu$ (c=1 in methanol containing 1% concentrated hydrochloric acid). pH of the 1% aqueous suspension 2.5. Solubility in water at 20° C., 7.7 mg/ml. The infrared absorption curve of the suspension in mineral oil mull shows the following main peaks: 3.08 $\mu$, 6.01 $\mu$, 6.2 $\mu$, 6.22 $\mu$, 8.06 $\mu$, 8.25 $\mu$, 8.64 $\mu$, 8.88 $\mu$, 9.43 $\mu$, 9.6 $\mu$, 9.82 $\mu$, 10.62 $\mu$, 12.4 $\mu$, 14.8 $\mu$.

The composition of this complex is $(C_{22}H_{24}N_2O_8 \cdot HPO_3)_n$, $n = 1-4$. The blood levels obtained after administration of this complex were not as prolonged as those obtained after administration of the polyphosphate sodium complex of doxycycline.

B. The metaphosphoric acid complex of doxycycline was prepared in accordance with the first example of U.S. Pat. No. 3,053,892 of Sieger et al.

In a 500 mls. round-bottomed flask equipped with stirrer, condenser, and thermometer was placed 7.1 grs. (0.05 mole) $P_2O_5$ which was immediately covered with 100 mls. of chloroform. To the mixture was added with stirring 0.9 mls. (0.05 mole) of distilled water. In a few minutes, a lower oily layer appeared. To this mixture was added 100 mls. of methanol and on continued stirring, the oily layer disappeared in the methanol forming a complete solution.

An additional 50 mls. of methanol was added to the flask and then 22.2 grs. (0.05 mole) of doxycycline, neutral form, was added portion-wise intermittently with another 50 mls. of methanol. A clear solution was maintained throughout the addition of the doxycycline.

After the addition of all of the doxycycline, the temperature in the reaction flask was 35° C.

One hour after addition of the doxycycline, the clear reaction solution was poured into 1500 mls. of chloroform. A yellow product separated and was collected on a coarse sintered glass filter and dried at 40° C. The doxycyline metaphosphoric acid complex weighed about 9.1 grs. Solubility in water at 20° C. 2.23 mg/ml. Melting point 180°–188° C. with decomposition. $E_{1cm}^{1\%}$ 214 at 348/52 m$\mu$, 274 at 268/69 m$\mu$ in methanol containing 1% hydrochloric acid. Specific rotation $[\alpha]_D - 80$ (c=1 in methanol containing 1% concentrated hydrochloric acid). Water content by Karl Fisher 3.1%.

1.3 grs. of the product above obtained was suspended in 4 mls. of water and stirred with 2.5 mls. of N NaOH. The product did not dissolve but formed a gummy mass. The doxycycline content of the supernatant after half an hour was 1.03 mg/ml. The mass triturated with isopropanol crystallized to yield doxycycline base monohydrate.

The latter assay was repeated but using 5 mls. of N NaOH. A gummy product was again obtained and the content of the supernatant was 7.05 mg/ml.

1.3 grs. of the metaphosphoric acid complex of doxycycline above obtained was suspended in 4 mls. of water and 2.5 mls. of N KOH was added, forming a gummy product, which consisted of doxycycline base. The doxycycline content of the supernatant was 19.4 mg/ml.

C. Comparative example B was repeated with the sole difference that the clear reaction solution was precipitated by adding 750 mls. of isopropyl alcohol instead of chloroform. Yield 14.6 grs. Solubility in water at 20° C. 2.74 mg/ml. Melting point 188°–189° C. with decomposition. $E_{1cm}^{1\%}$ 239 at 348–352 m$\mu$ and 317 at 268–269 m$\mu$ in methanol containing 1% concentrated hydrochloric acid. Specific rotation $[\alpha]_D$ −85 (c=1 in methanol containing 1% concentrated hydrochloric acid). Water content by Karl Fisher 4.2%. The infrared curve of the product was identical to that of comparative example A, with the exception that this latter showed traces of chloroform by the accentuated maximum at about 13 $\mu$.

D. 4.2 grs. of phosphorous pentoxide was covered with 100 mls. of chloroform and 0.54 mls. of water was added. After stirring for two and a half hours, 100 mls. of methanol was added and stirring continued for an additional 15 minutes. Subsequently, an additional 50 mls. of methanol was added, followed by the addition, portion-wise, of 23 grs. of doxycycline base (961 mcg/mg) and 50 mls. of methanol, at a temperature not exceeding 35° C. and maintaining a clear solution throughout the addition. After an hour of subsequent agitation, 400 mls. of isopropanol was added, which provoked the precipitation of the metaphosphoric acid complex of doxycycline (mole proportion of the reactants: 5 moles of $C_{22}H_{24}N_2O_8$ and 6 moles of $HPO_3$). It was then filtered, washed with isopropanol and dried at 40° C. It weighed 22.4 grs. Solubility in water at 20° C. 5.15 mg/ml. Melting range 181°–198° C. with decomposition. $E_{1cm}^{1\%}$ 249 at 349–354 m$\mu$ and 326 at 268–269 m$\mu$ in methanol containing 1% concentrated hydrochloric acid. Water content by Karl Fisher 4.1%.

To 2.7 grs. of the above substance in 10 mls. of water, 1 ml. of normal sodium hydroxide was added with a view to preparing from this metaphosphoric acid complex the water soluble polymetaphosphate sodium complex of doxycycline $(C_{22}H_{24}N_2O_8)_5 \cdot NaPO_3 \cdot (HPO_3)_5$. However, the product did not dissolve, even after stirring for 24 hours. The gummy product which was formed crystallized overnight and its infrared absorption curve was identical to that of doxycycline base monohydrate.

E. Comparative example C was repeated but adding 18.4 grs. of doxycycline base monohydrate (961 mcg/mg) instead of 23 grs. The metaphosphoric acid complex of doxycycline thus obtained (mole proportion of the reactants: 4 moles of $C_{22}H_{24}N_2O_8$ and 6 moles of $HPO_3$) weighed 13.5 grs. Solubility in water at 20° C. 3.05 mg/ml. Melting range 190°–195° C. $E_{1cm}^{1\%}$ 257 at 348–354 m$\mu$ and 336 at 268 m$\mu$ in methanol containing 1% concentrated hydrochloric acid. Specific rotation $[\alpha]_D - 90$ (c=0.5 in methanol containing 1% concentrated hydrochloric acid). Water content by Karl Fisher 4.03%.

To 2.25 grs. of the above substance in 10 mls. of water, 2 mls. of normal sodium hydroxide was added with a view to preparing from this metaphosphoric acid complex the water soluble polymetaphosphate sodium complex of doxycycline $(C_{22}H_{24}N_2O_8)_4 \cdot (NaPO_3)_2 \cdot (HPO_3)_4$. However, the acid complex did not dissolve, even after stirring for 24 hours. The insoluble material which crystallized overnight consisted mainly of doxycycline base monohydrate.

9. For the purpose of further comparison and differentiation, doxycycline base monohydrate was reacted with metaphosphoric acid in aqueous medium in various mole ratios as to obtain the respective acid addition salts according to U.S. Pat. No. 3,200,149:

A. 2.31 grs. (0.005 mole) of doxycycline base monohydrate were dissolved in 15 mls. of dimethylformamide, and a solution of 0.40 g. (0.005 mole) of metaphosphoric acid in 5 mls. of water was added. After stirring for half an hour, it was filtered, washed and dried. It weighed 1.65 grs. Solubility in water at 20° C. 2.42 mg/ml. $E_{1cm}^{1\%}$ 249 at 348–353 m$\mu$ and 328 at 268–269 m$\mu$ in methanol containing 1% concentrated hydrochloric acid. Its infrared absorption curve in mineral oil mull has the following main peaks: 2.94 $\mu$, 3.1 $\mu$, 6.03 $\mu$, 6.2–6.3 $\mu$ (dublets), 6.55 $\mu$, 7.58 $\mu$, 7.83 $\mu$, 8.07 $\mu$, 8.24 $\mu$, 8.57 $\mu$, 8.9 $\mu$, 9.15 $\mu$, 9.63 $\mu$, 10.0 $\mu$, 10.49 $\mu$, 10.68 $\mu$, 11.23 $\mu$, 12.38 $\mu$. It differs essentially from that of the metaphosphoric acid complexes of doxycycline as well as from that of the complexes of the present invention.

B. 2.3 grs. of doxycycline base monohydrate were dissolved in 15 mls. of dimethylformamide and 0.48 g. of metaphosphoric acid dissolved in 30 mls. of water was added. After stirring for half an hour, it was filtered, washed and dried. The product obtained $(C_{22}H_{24}N_2O_8)_5 \cdot (HPO_3)_6$ weighed 2.1 grs. and had a solubility in water at 20° C. of 0.9 mg/ml. $E_{1cm}^{1\%}$ 238 at 349–352 m$\mu$ and 319 at 267–268 m$\mu$ in methanol containing 1% hydrochloric acid.

C. Comparative example B above was repeated but adding 1 ml. of normal sodium hydroxide after addition of the metaphosphoric acid solution. The product obtained weighed 1.6 grs. and had a solubility in water at 20° C. of 0.77 mg/ml. $E_{1cm}^{1\%}$ 260 at 347–354 m$\mu$ and 340 at 268–269 m$\mu$ in methanol containing 1% concentrated hydrochloric acid. The pH of a 1% aqueous suspension was 4.2. Its infrared absorption curve in mineral oil mull has the following main peaks: 2.86 $\mu$, 2.98 $\mu$, 3.08 $\mu$, 5.99 $\mu$, 6.24 $\mu$, 6.36 $\mu$, 7.61 $\mu$, 7.82 $\mu$, 7.96$\mu$, 8.1 $\mu$, 8.6 $\mu$, 8.9 $\mu$, 9.01 $\mu$, 9.17 $\mu$, 9.32 $\mu$, 9.67

μ, 10.01 μ, 10.7 μ, 11.25 μ, 11.5 μ, 11.8 μ, 12.12 μ, 12.4 μ, 12.53 μ, 12.66 μ. This absorption curve differs only slightly from that of doxycycline base monohydrate; it differs considerably from that of the polymetaphosphate sodium complex described in example 4; and it also differs from that of the hexametaphosphate sodium complex of doxycycline described in example 7.

D. Comparative example B was repeated but using 1.85 grs. of doxycycline base monohydrate instead of 2.77 grs. The product obtained $(C_{22}H_{24}N_2O_8)_4 \cdot (HPO_3)_6$ weighed 1.45 grs. and had a solubility in water at 20°C. of 0.87 mg/ml. $E_{1cm}^{1\%}$ 238 at 349–352 mμ and 311 at 268–269 mμ in methanol containing 1% concentrated hydrochloric acid.

E. Comparative example D above was repeated but adding 2 mls. of normal sodium hydroxide after addition of the metaphosphoric acid solution. The product obtained weighed 2.1 grs. and had a solubility in water at 20° C. of 0.5 mg/ml. $E_{1cm}^{1\%}$ 332 at 348–352 mμ and 426 at 267–269 mμ in methanol containing 1% concentrated hydrochloric acid. It consisted mainly of doxycycline base monohydrate.

F. To 2.56 grs. of doxycycline hyclate dissolved in 20 mls. of water, a solution of 0.48 g. of metaphosphoric acid in 5 mls. of water was added under stirring. After 30 minutes, it was filtered, washed with water and dried. The acid addition salt of doxycycline $(C_{22}H_{24}N_2O_8)_5 \cdot (HPO_3)_6$ weighed 2.4 grs. and had a solubility in water at 20° C. of 1.12 mg/ml. $E_{1cm}^{1\%}$ 245 at 350–354 mμ and 320 at 267–268 mμ in methanol containing 1% concentrated hydrochloric acid. Specific rotation $[\alpha]_D - 100$ (c—0.5 in methanol containing 1% concentrated hydrochloric acid).

G. 750 mgs. of the compound obtained under F was suspended in 5 mls. of water and 0.25 ml of normal sodium hydroxide solution was added. It dissolved first but then crystallized, yielding 0.5 g of impure doxycycline base monohydrate. Solubility in water at 20° C. 0.66 mg/ml. $E_{1cm}^{1\%}$ 332 at 348–352 mμ in methanol containing 1% concentrated hydrochloric acid. pH of a 1% solution 4.4.

H. Comparative example F was repeated but using 2.048 grs. of doxycycline hyclate instead of 2.56 grs. to prepare the acid addition salt of 4 moles of doxycycline with 6 moles of metaphosphoric acid. The yield was 1.9 grs. Solubility in water at 20° C. 0.45 mg/ml. $E_{1cm}^{1\%}$ 245 at 350–354 mμ and 330 at 267–269 mμ in methanol containing 1% concentrated hydrochloric acid. Specific rotation $[\alpha]_D - 90$ (c=0.5 in methanol containing 1% concentrated hydrochloric acid). Its infrared absorption curve was comparable to that of the product obtained in example 9 D.

I. 625 mgs. of the product obtained above under G was suspended in 5 mls. of water and 0.5 ml of normal sodium hydroxide solution was added under stirring. The product first dissolved and then crystallized. It consisted of impure doxycycline base monohydrate. Solubility in water at 20° C. 0.69 mg/ml. $E_{1cm}^{1\%}$ 307 at 347–352 mμ in methanol containing 1% concentrated hydrochloric acid.

10. In an attempt to prepare a hexametaphosphate sodium complex from the simple acid addition salt of doxycycline, to an aqueous solution of 2.6 grs. of doxycycline hyclate, 0.4 g of metaphosphoric acid dissolved in 5 mls of water was added, and 6 mls of normal sodium hydroxide solution was subsequently added in one run. After stirring for half an hour, it was filtered, washed with water and dried, weighing 2.2 grs. Its infrared absorption curve was essentially identical to that of the hexametaphosphate sodium complex of doxycycline described in example 7. $E_{1cm}^{1\%}$ 245 at 350–353 mμ in methanol containing 1% concentrated hydrochloric acid.

With a view to comparing and differentiating the alkali metal polyphosphate complexes of doxycycline from the complexes obtained in accordance with the above cited prior art, some differentiating characteristics are set forth in Tables I and II.

TABLE I

| Substance | Composition (or mole proportion of the reactants) | Solubility in water mg/ml at 20° C | Average blood levels in mcg/ml (single oral dose of 200 mg) after 4 hours | 24 | Examples |
|---|---|---|---|---|---|
| Monosodium polymetaphosphate Complex of doxycycline | $(C_{22}H_{24}N_2O_8)_5 \cdot NaPO_3 \cdot (HPO_3)_5$ | 300 | 3.0 | 1.1 | 4 & 5 |
| Disodium polymetaphosphate Complex of doxycycline | $(C_{22}H_{24}N_2O_8)_4 \cdot (NaPO_3)_2 \cdot (HPO_3)_4$ | 292 | 3.1 | 1.1 | 6 |
| Metaphosphoric acid Complexes of doxycycline (according to process in U.S. Patent No. 3,053,892) | 1 mole $C_{22}H_{24}N_2O_8$/1 mole $HPO_3$ | 7.7 | 2.0 | 0.42 | 8A** |
| | 5 moles $C_{22}H_{24}N_2O_8$/6 moles $HPO_3$ | 5.15 | 1.8 | 0.34 | 8D** |
| | 4 moles $C_{22}H_{24}N_2O_8$/6 moles $HPO_3$ | 3.05 | 1.8 | 0.3 | 8E*** |
| | 3 moles $C_{22}H_{24}N_2O_8$/6 moles $HPO_3$* | 2.23 | 1.4 | 0.2 | 8B**** |
| Hexametaphosphate sodium complex of doxycycline (according to process in U.S. Patent No. 2,791,609) | $(C_{22}H_{24}N_2O_8)_5 \cdot NaPO_3 \cdot (HPO_3)_5$ | 0.65 | 0.64 | 0.2 | 7 |
| Doxycycline hyclate and | $C_{22}H_{24}N_2O_8 \cdot HCl \cdot \frac{1}{2} H_2O \cdot \frac{1}{2} C_2H_5OH$ | 330 | 2.2 | 0.7 | |
| Doxycycline base monohydrate | $(C_{22}H_{24}N_2O_8) \cdot H_2O$ | 0.5 | 2.3 | 0.6 | |

*Proportion and method according to Example 1 of U.S. Patent No. 3,053,892
**Addition of 1 mole aqueous NaOH yields doxycycline base monohydrate
***Addition of 2 moles aqueous NaOH yields doxycycline base monohydrate
****Addition of 3 moles aqueous NaOH yields doxycycline base monohydrate

TABLE II

| Substance | Mol proportion of reactants $C_{22}H_{24}N_2O_8$ | $HPO_3$ | NaOH | Solvent | Solubility mg/ml | Average blood levels in mcg/ml (single oral dose of 200 mgs.) expressed in 100% doxycycline after 4 hours | 24 hours | Example |
|---|---|---|---|---|---|---|---|---|
| Doxycyline metaphosphoric acid addition salt (according to process in U.S. Patent No. 3,200,149) | as base 6 | 6 | 0 | DMF/$H_2O$ | 2.42 | 1.0 | 0.35 | 9A |
| | 5 | 6 | 0 | DMF/$H_2O$ | 0.90 | 0.9 | 0.3 | 9B |
| | 4 | 6 | 0 | DMF/$H_2O$ | 0.87 | 0.95 | 0.3 | 9D |
| | 3 | 6 | 0 | DMF/$H_2O$ | 0.74 | 0.7 | 0.2 | |
| | 5 | 6 | 1 | DMF/$H_2O$ | 0.77 | 0.9 | 0.4 | 9C |
| | 4 | 6 | 2 | DMF/$H_2O$ | 0.5 | 1.6 | 0.5 | 9E* |
| | as hyclate 5 | 6 | 0 | $H_2O$ | 1.12 | 1.0 | 0.35 | 9F** |
| | 4 | 6 | 0 | $H_2O$ | 0.45 | 0.95 | 0.4 | 9H*** |
| | 5 | 5 | 6 | $H_2O$ | 0.8 | 0.65 | 0.25 | 10**** |

*Product is impure base monohydrate
**Addition of 1 mole NaOH yields the impure base monohydrate (Example 9G)
***Addition of 1 mole NaOH yields the impure base monohydrate (Example 9I)
****Product is hexametaphosphate sodium complex as in Example 7

I claim:

1. A complex of α-6-deoxy-5-hydroxytetracycline and an alkali metal salt of polymetaphosphoric acid having at least one free acid group, said α-6-deoxy-5-hydroxytetracycline being present in 1 to 5 moles per mole of complex, and said complex having a solubility in water of 4.5 to about 300 mg/ml.

2. The complex according to claim 1 of the formula $C_{22}H_{24}N_2O_8 \cdot NaPO_3 \cdot (HPO_3)_5$.

3. The complex according to claim 1 of the formula $C_{22}H_{24}N_2O_8 \cdot (NaPO_3)_2 \cdot (HPO_3)_4$.

4. The complex according to claim 1 of the formula $C_{22}H_{24}N_2O_8 \cdot (NaPO_3)_3 \cdot (HPO_3)_3$.

5. The complex according to claim 1 of the formula $(C_{22}H_{24}N_2O_8)_2 \cdot NaPO_3 \cdot (HPO_3)_5$.

6. The complex according to claim 1 of the formula $(C_{22}H_{24}N_2O_8)_3 \cdot NaPO_3 \cdot (HPO_3)_5$.

7. The complex according to claim 1 of the formula $(C_{22}H_{24}N_2O_8)_4 \cdot NaPO_3 \cdot (HPO_3)_5$.

8. The complex according to claim 1 of the formula $(C_{22}H_{24}N_2O_8)_5 \cdot NaPO_3 \cdot (HPO_3)_5$.

9. The complex according to claim 1 of the formula $(C_{22}H_{24}N_2O_8)_2 \cdot (NaPO_3)_2 \cdot (HPO_3)_4$.

10. The complex according to claim 1 of the formula $C_{22}H_{24}N_2O_8 \cdot NaPO_3 \cdot HPO_3$.

11. The complex according to claim 1 of the formula $C_{22}H_{24}N_2O_8 \cdot NaPO_3 \cdot (HPO_3)_2$.

12. The complex according to claim 1 of the formula $C_{22}H_{24}N_2O_8 \cdot NaPO_3 \cdot (HPO_3)_3$.

13. The complex according to claim 1 of the formula $C_{22}H_{24}N_2O_8 \cdot NaPO_3 \cdot (HPO_3)_4$.

14. A process for the preparation of alkali-polymetaphosphate complexes of α-6-deoxy-5-hydroxytetracycline of the formula $(C_{22}H_{24}N_2O_8)_z \cdot (MePO_3)_x \cdot (HPO_3)_y$ wherein Me is sodium or potassium, $z = 1$ to $5$, $x = 1$ to $5$, $y = 1$ to $5$, $x + y \leq 6$ and $z \leq y$, having a solubility in water superior to 4.5 mg/ml, comprising the step of reacting α-6-deoxy-5-hydroxytetracycline with an alkali metal polymetaphosphate having at least one free acid function in a reaction inert anhydrous organic solvent.

15. The process according to claim 14 wherein metaphosphoric acid $(HPO_3)_n$ ($n = 2$–$6$) is reacted in a reaction inert anhydrous organic solvent with 1 to 5 moles of sodium or potassium hydroxide, α-6-deoxy-5-hydroxytetracycline is added to the alkali metal phosphate solution thus obtained, and the complex thus formed is precipitated by addition of a reaction inert non-solvent.

16. The process according to claim 14 wherein the α-6-deoxy-5-hydroxytetracycline is reacted with metaphosphoric acid and then with an alkali metal hydroxide.

* * * * *